UNITED STATES PATENT OFFICE.

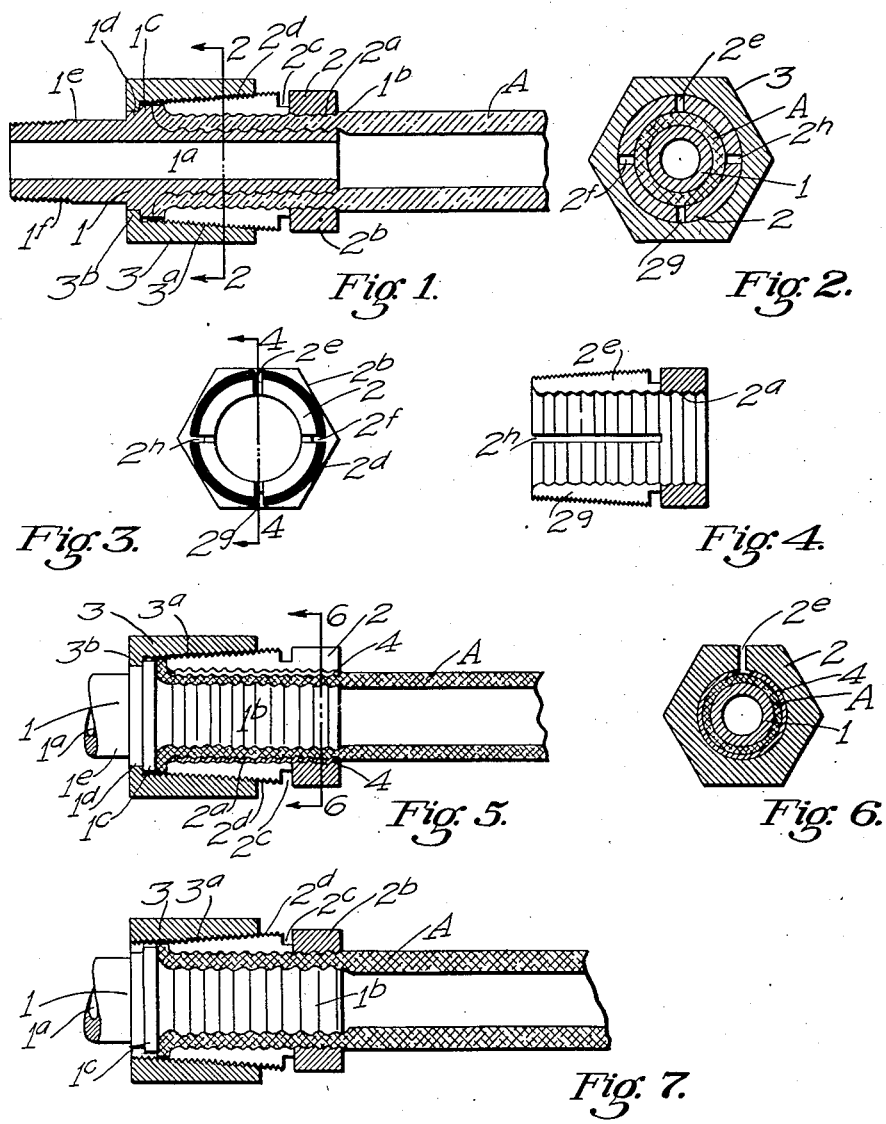

ROY D. CRIPPEN, OF SAN DIEGO, CALIFORNIA, ASSIGNOR OF ONE-HALF TO GEORGE B. SHELDON, OF LA MESA, CALIFORNIA.

HOSE-COUPLING.

1,370,289.      Specification of Letters Patent.      Patented Mar. 1, 1921.

Application filed October 29, 1919. Serial No. 334,214.

*To all whom it may concern:*

Be it known that I, ROY D. CRIPPEN, a citizen of the United States, residing at San Diego, in the county of San Diego and State of California, have invented certain new and useful Improvements in Hose-Couplings, of which the following is a specification.

My invention relates to a hose coupling more particularly adapted for use for coupling a hose to a pipe line for high pressure purposes such as air under pressure or steam and the objects of my invention are: first, to provide a coupling of this class in which a very rigid coupling is made and which will not readily leak; second, to provide a coupling of this class wherein the hose is clamped to an insert member which provides a uniform pressure on the hose its full circumference; third, to provide a device of this class wherein the hose is secured by means of a single clamp member provided with a plurality of flexible sections; fourth, to provide a device of this class which is applicable for use for varying sized hose and fifth, to provide a device of this class which is very simple and economical of construction, durable, positive in its action, easy to install and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a longitudinal sectional view of my coupling complete shown with a fragmentary portion of a hose in position; Fig. 2 is a transverse sectional view through 2—2 of Fig. 1; Fig. 3 is an end view of the clamp member; Fig. 4 is a longitudinal sectional view thereof through 4—4 of Fig. 3; Fig. 5 is a longitudinal sectional view of the coupling in a slightly modified form from that of Figs. 1, 2, 3 and 4; Fig. 6 is a sectional view through 6—6 of Fig. 5 and Fig. 7 is a longitudinal sectional view of the coupling in another slightly modified form from that of Figs. 1 to 6 inclusive Similar characters of reference refer to similar parts and portions throughout the several views of the drawings.

The insert member 1, clamp member 2, nut 3 and bushing 4 constitute the principal parts and portions of my hose coupling.

The insert member 1 is provided with a hole $1^a$ longitudinally therethrough and the one end is provided with a corrugated outer surface $1^b$ over which the hose A fits tightly. It is provided with an outwardly extending flange $1^c$ intermediate its ends and with a reduced portion $1^d$ on one side thereof with another reduced portion $1^e$ which is threaded at its outer end at $1^f$ adapted to be fitted into a conducting pipe connection. Mounted over one end of the hose A is the clamp member 2 which is adapted to fit snugly on to the end of the hose and provided with an inner corrugated surface $2^a$. It is provided externally at one end with a hexagon portion $2^b$ and adjacent thereto with an annular groove $2^c$. From said groove $2^c$ to the small end it is tapered and provided with an external thread $2^d$. It is also provided with a plurality of longitudinal slots, in this case I have shown four, $2^e$, $2^f$, $2^g$, and $2^h$, although there may be more if desired. In the preferred form these slots extend only through the groove $2^c$ from the small end thus providing a plurality of flexible portions adapted to be clamped against the outer surface of the hose. This member 2 is forced over the end of the hose, then the hose with the member 2 is forced over the insert member 1 as shown best in Fig. 1 of the drawings. In order to secure the clamp member 2 there is provided a nut 3 which is provided with an internal tapered thread $3^a$ adapted to fit the thread $2^d$ on the member 2. This nut 3 is also provided with an inwardly extending flange $3^b$ which is adapted to fit over the reduced portion $1^d$ and rest against the one side of the flange $1^e$ when screwed tightly on to the threaded end of the member 2 all as shown best in Fig. 1 of the drawings. It will be noted that when the nut 3 is screwed on to the flexible portions of the member 2 they are pressed inwardly against the hose the slots $2^e$, $2^f$, $2^g$, $2^h$ and groove $2^c$ permitting the flexible movement of the extended threaded portions of the member 2 to readily move inwardly thus compressing the hose uniformly its full circumference depending on the number of slots in the member 2.

In the modified form of construction shown in Figs. 5 and 6 of the drawings, the slot 2ᵉ extends the full length of the member 2 and the remaining slots to and through the groove 2ᶜ only and there is provided a bushing 4 which may be inserted between the member 2 and the hose in case the hose is of a slightly smaller diameter. This bushing 4 is provided with a longitudinal slot in one side and with a plurality of slots extending a portion of its length positioned an equal distance around said bushing. In the modified form of construction shown in Fig. 7 of the drawings the construction is the same as that shown in Fig. 1 except the internally extended flange 3ᵇ is eliminated so that the nut may pass over the flange 1ᶜ and pass farther on to the member 2.

Though I have shown and described a particular construction, combination and arrangement of parts and portions and certain modifications thereof I do not wish to be limited to this particular construction, combination and arrangement nor to the modifications thereof but desire to include in the purview of my invention the construction, combination and arrangement substantially as set forth in the appended claims.

It is obvious that with this construction there is provided a coupling for connecting a hose to a conducting pipe line in which the hose is rigidly clamped in position; that the construction of the clamp member is such that the pressure is uniform around the hose; that with this device the hose is easily installed in position and that the device is simple and economical of construction, durable and efficient.

Having thus described my invention what I claim as new and desire to secure by Letters Patent, is:

1. In a coupling of the class described, the combination with a hose, of a hollow insert member provided with an external thread on its one end and an extended hose insert portion at its other end and having an outwardly extending flange intermediate its ends, a hollow clamping member provided with a plurality of longitudinal slots extending through the walls thereof and with an annular circumferential groove with which the end of some of said slots terminate and provided with an externally tapered thread on the slotted end and a nut provided with an internally tapered thread conforming to the thread on said clamp member adapted to be screwed onto the tapered thread on said clamp member.

2. In a coupling of the class described, the combination with a hose, of a hollow insert member provided with an external thread on its one end and a circumferentially corrugated external surface at its other end and having an outwardly extending flange intermediate its ends, a hollow clamping member provided, with a plurality of longitudinal slots extending through the walls thereof and with an annular circumferential groove with which the end of some of said slots terminate and provided with an externally tapered thread on the slotted end and a nut provided with an internally tapered thread conforming to the thread on said clamp member adapted to be screwed on to the tapered thread on said clamp member.

3. In a coupling of the class described, the combination with a hose, of a hollow insert member provided with an external thread on its one end and a circumferentially corrugated external surface at its other end and having an outwardly extending flange intermediate its ends, a hollow clamping member provided with a plurality of longitudinal slots extending through the walls thereof and with an annular circumferential groove with which the end of some of said slots terminate and provided with an externally tapered thread on the slotted end and provided on the one end thereof with means for holding it from turning, and a nut provided with an internally tapered thread conforming to the thread on said clamp member adapted to be screwed on to the tapered thread on said clamp member.

In testimony whereof, I have hereunto set my hand at San Diego, California, this 23rd day of October, 1919.

ROY D. CRIPPEN.